United States Patent
Nakanishi et al.

(10) Patent No.: US 6,193,765 B1
(45) Date of Patent: Feb. 27, 2001

(54) METHOD OF MANUFACTURING CYLINDRICAL NON-AQUEOUS ELECTROLYTE SECONDARY CELL

(75) Inventors: Naoya Nakanishi, Tondabayashi; Hideyuki Inomata, Mihara-gun; Mitsuzou Nogami, Itano-gun; Ikuo Yonezu; Koji Nishio, both of Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/163,015

(22) Filed: Sep. 30, 1998

(30) Foreign Application Priority Data

Sep. 30, 1997 (JP) .................................... 9-266172

(51) Int. Cl.[7] ............................. H01M 6/02; H01M 2/26
(52) U.S. Cl. ................... 29/623.1; 429/121; 429/122; 429/161; 429/211
(58) Field of Search .................... 429/121, 122, 429/161, 211; 29/623.1

(56) References Cited

U.S. PATENT DOCUMENTS

| | | | |
|---|---|---|---|
| 5,707,756 | * | 1/1998 | Inoue et al. ............................. 429/57 |
| 5,731,098 | * | 3/1998 | Suzuki ..................................... 429/53 |
| 5,736,270 | | 4/1998 | Suzuki et al. . |
| 5,972,532 | * | 10/1999 | Oweis et al. ........................... 429/94 |
| 6,019,802 | * | 2/2000 | Ishizuka et al. ..................... 29/623.5 |

FOREIGN PATENT DOCUMENTS

| | | |
|---|---|---|
| 6-267528 | 9/1994 | (JP) . |
| 9-298055 | 11/1997 | (JP) . |
| 9-306465 | 11/1997 | (JP) . |

\* cited by examiner

Primary Examiner—Maria Nuzzolillo
Assistant Examiner—Tracy Dove
(74) Attorney, Agent, or Firm—Armstrong, Westerman, Hattori, McLeland & Naughton

(57) ABSTRACT

A method of manufacturing a cylindrical non-aqueous electrolyte secondary cell according to the present invention comprises a first step of forming a lead-attaching area on which an active material layer is not formed, in a positive electrode wherein a positive electrode active material layer is formed on both sides of the positive electrode current collector and a negative electrode wherein a negative electrode active material layer is formed on both sides of the negative electrode current collector, and winding the positive electrode and the negative electrode with disposing a separator therebetween so that the lead-attaching areas are protruded from the edges of the separator, and a second step of disposing a lead at an end part of the lead-attaching area with interposing a metal plate having a multiplicity of holes, and thereafter laser-welding the lead and the metal plate and the lead-attaching area by applying a laser beam with a spot diameter larger than a hole diameter of the metal plate. According to the present invention, it is feasible to laser-weld a lead to a lead-attaching area without fear of a short circuit resulting from the fusion in an electrode assembly caused by a laser beam.

13 Claims, 5 Drawing Sheets

METHOD OF MANUFACTURING CYLINDRICAL NON-AQUEOUS ELECTROLYTE SECONDARY CELL

BACKGROUND OF THE INVENTION (1) Field of the Invention

This invention relates to a method of manufacturing a cylindrical non-aqueous electrolyte secondary cell, and more particularly to a method of manufacturing a cylindrical non-aqueous electrolyte secondary cell usable for a battery-powered vehicle and the like, wherein a high power density is required.

(2) Description of the Prior Art

A conventional cell of this type generally has a spiral type electrode assembly in which a sheet type positive electrode and negative electrode are spirally wound with a separator disposed therebetween. Electric current is collected from the spiral electrode assembly through conductive labs that are attached on each end part of the aforementioned electrode and current terminals that are electrically connected to the conductive tabs. In a cell of this type, when the cell is a small-sized cylindrical non-aqueous electrolyte secondary cell with a small electric current, the current collecting effect can be sufficient. However, when the cell is a large-sized one with a large electric current, it is difficult to obtain a satisfactory current collecting effect.

In view of the above problem, Japanese Unexamined Patent Publication No. 6-267528 discloses a cylindrical non-aqueous electrolyte secondary cell having the following features. The cell has a sheet type current collector in both the positive electrode and the negative electrode. In both electrodes, a lengthwise end area of the current collector is protruded from a separator, and at the same time the lengthwise end area to which a lead is to be attached is exposed without an active material applied thereon. Then, a positive electrode lead-attaching area and a positive electrode lead, and a negative electrode lead-attaching area and a negative electrode lead are respectively welded.

However, such cylindrical non-aqueous electrolyte secondary cells have certain drawbacks. For the cells of such construction, spot welding is generally employed to weld a lead to a lead-attaching area in each electrode. In this case, when the current collectors have a small thickness of less than 50 $\mu$m, the lead-attaching area thereof is apt to be damaged since, in spot welding, pressure is applied to the area. To prevent the damage, the lead-attaching area requires a reinforcement means, for example, by metal foil and the like, which consequently lowers production efficiency.

As a solution to this problem, laser welding can be employed to weld a lead to a lead-attaching area in each electrode. Laser welding is a non-contact type welding method, in which no pressure is applied on to lead-attaching areas. The reinforcement means to the lead-attaching areas can therefore be eliminated, and workability in manufacturing a cell is thereby improved.

However, laser welding incurs a different problem.

In the present state of the art, in welding a lead to a lead-attaching area, it is extremely difficult to direct a laser beam to an exact position to be welded. Therefore, when a laser beam is applied onto a lead, an area in the electrode assembly except the region to be welded is also exposed to the laser beam indiscriminately. As a result, the irradiated area of the lead is fused and holes are formed, and the laser beam passes through the holes and reaches the internal electrode assembly, resulting in fusion of the electrode assembly and thereby a short circuit.

SUMMARY OF THE INVENTION

In view of the above problems, it is an object of the present invention to provide a method of manufacturing a cylindrical non-aqueous electrolyte secondary cell wherein a laser welding of a lead-attaching area and a lead can be carried out without fear of a short circuit resulting from fusion of the electrode assembly by a laser beam.

It is another object of the present invention to provide a method of manufacturing a cylindrical non-aqueous electrolyte secondary cell having remarkably improved power density by substantially reducing an internal resistance of the cell.

It is further another object of the present invention to provide a method of manufacturing a cylindrical non-aqueous electrolyte secondary cell wherein the production efficiency is improved by eliminating the step of reinforcing lead-attaching areas.

These and other objects are accomplished in accordance with the present invention by employing a method of manufacturing a rechargeable cylindrical non-aqueous electrolyte secondary cell, comprising the steps of:

a first step of forming a lead-attaching area, on which an active material layer is not formed, on at least one current collector in a positive electrode having a positive electrode active material layer formed on both sides of a sheet type positive electrode current collector and a negative electrode having a negative electrode active material layer formed on both sides of a sheet type negative electrode current collector, and winding both the electrodes into a spiral shape with disposing a sheet type separator therebetween so that the lead-attaching area is protruded from an end part of the separator; and a second step of disposing a lead at an edge of the lead-attaching area with interposing a metal plate having a multiplicity of holes and thereafter laser-welding the lead and the metal plate and the lead-attaching area together by applying a laser beam with a spot diameter larger than a hole diameter of the metal plate.

The reasons for accomplishing the aforementioned objects are as follows. In the laser-welding step described above, a laser beam is applied to the subjected lead. In the subjected lead, even if an area where the lead-attaching area is not disposed is irradiated with the laser beam and holes are formed by the laser irradiation, the internal electrode assembly is not fully irradiated with the laser beam passing through the lead. Therefore, the damage to the electrode assembly such as fusion of the electrode assembly and a consequent short circuit can be avoided. More specifically, the laser beam is completely or partially shielded by the metal plate disposed between the lead and the lead-attaching area because the laser spot diameter is larger than the hole diameter of the metal plate. When the laser beam is completely shielded, the electrode assembly is not irradiated with the beam, and even when the beam is partially shielded, the beam which reaches the electrode assembly is only the portion which passes through the holes of the metal plate. In other words, even if the laser beam penetrates the lead and hits the electrode assembly, the strength of the laser is diminished by the metal plate to the degree that it does not affect the electrode assembly, by the time it reaches the electrode assembly.

In addition, since the lead-attaching area integrally formed with the current collector has a sheet-like shape and the lead-attaching area is attached to a lead by laser welding, a small potential gradient and an even current distribution can be obtained in the current collector. Consequently, even with a large-sized cell, electric current is impartially corrected from the electrodes with a large area, and thereby the internal resistance of the cell is remarkably reduced.

In the method according to the present invention, a rate of hole area of the metal plate may be from 45 to 75%.

The reason for such restriction of the rate of hole area of the metal plate is as follows. If a rate of hole area of the metal plate is rendered smaller, the metal plate with holes will have more similar effect to that of the metal plate without holes, and consequently, the effect of the metal plate with holes will simply become similar to the lead with an increased thickness. When a thickness of the lead is increased, a laser output power should be increased correspondingly in order to properly carry out the laser welding. An increased laser output power will accordingly increase the possibility of the damage to the electrode assembly by a laser beam.

On the other hand, if a rate of hole area of the metal plate is too large, the electrical connection between the lead and the metal plate and the lead-attaching area becomes sufficient, and therefore the internal resistance of the cell increases.

In the method of the present invention, a punched metal may be employed as the metal plate with a multiplicity of holes.

The same effects as described above can be obtained by employing a punched metal as the metal plate.

In the case where a punched metal is employed, a hole diameter of the punched metal may be restricted within the range of 0.05 to 0.3 mm, when the conditions of laser-welding are that a laser spot diameter is about 1 mm, a laser output power for the positive electrode is 70 W, and a laser output power for the negative electrode is 50 W, and at the same time a rate of hole area of the punched metal is 50%.

If a hole diameter of the punched metal is less than 0.05 mm, the cell characteristics are deteriorated because the laser beam penetrates the lead and the punched metal and damages the electrode assembly. On the other hand, if a hole diameter of the punched metal is more than 0.3 mm, the electrical connection between the lead and the punched metal and the lead-attaching area becomes insufficient, which causes an increase in the internal resistance of the cell.

Further, in the case where a punched metal is employed, a thickness of the punched metal may be restricted within the range of 0.01 to 0.2 mm.

If a thickness of the punched metal is less than 0.01 mm, the cell characteristics are deteriorated because the laser beam penetrates the lead and the punched metal and damages the electrode assembly. On the other hand, if a thickness of the punched metal is more than 0.2 mm, the electrical connection between the lead and the punched metal and the lead-attaching area becomes insufficient, which causes an increase in the internal resistance of the cell.

The positive electrode active material in the method of the present invention may be a lithium-containing complex oxide.

In the case where a lithium-containing complex oxide is employed, the lithium-containing complex oxide may be selected from the group consisting of $LiCoO_2$, $LiNiO_2$, and $LiMn_2O_4$.

The negative electrode active material in the method of the present invention may be a carbonaceous material.

In the case wherein a carbonaceous material is employed as a negative electrode active material, the carbonaceous material may be selected from the group consisting of natural graphite, synthetic graphite, and coke.

The non-aqueous electrolyte in the method of the present invention may consist of a solution in which a solute is dissolved at a rate of 0.7 to 1.5 M in a solvent that is a mixture of an organic solvent and a low boiling point solvent.

In the case where the above-mentioned solution is employed as a non-aqueous electrolyte, the organic solvent therein may be selected from the group consisting of ethylene carbonate, vinylene carbonate, propylene carbonate, and combinations thereof.

Further, the low boiling point solvent may be selected from the group consisting of diethyl carbonate, dimethyl carbonate, 1,2-dimethoxyethane, 1,2-diethoxyethane, ethoxymethoxyethan, and combinations thereof.

In addition, the solute may be selected from the group consisting of $LiPF_6$, $LiClO_4$, $LiCF_3SO_3$, and combinations thereof.

BRIEF DESCRIPTION OF THE DRAWINGS

The present invention will be further illustrated with reference to the accompanying drawings wherein.

DESCRIPTION OF THE PREFERRED EMBODIMENT

Referring now to the FIGS. 1 to 7, there is described a method of manufacturing cylindrical non-aqueous electrolyte secondary cells in accordance with a preferred embodiment of the present invention.

EXAMPLE

Figure 1:
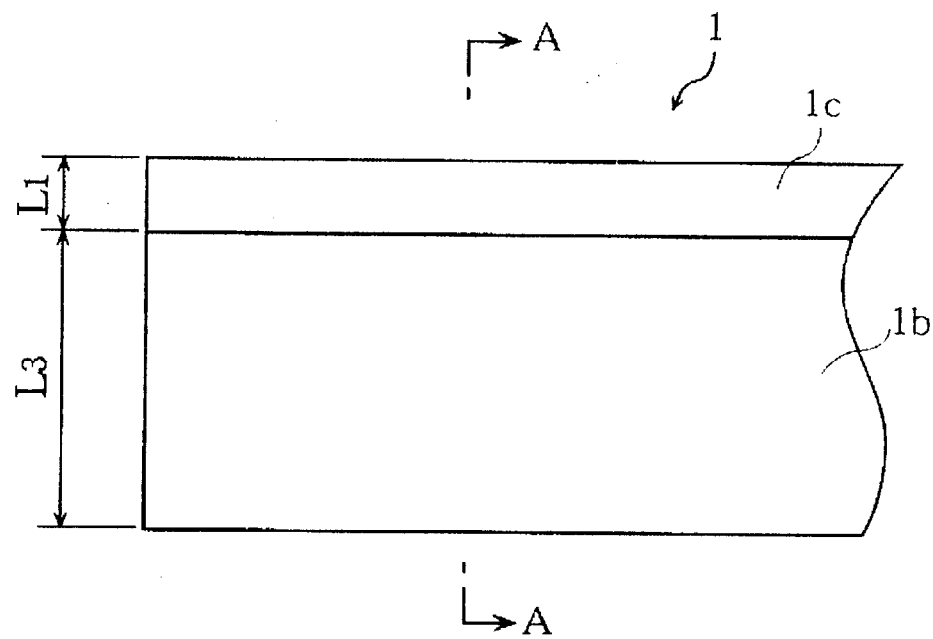
FIG. 1 is a front view of a positive electrode used for the present invention.
Figure 2:
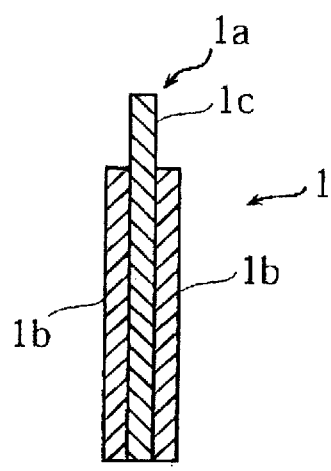
FIG. 2 is a cross-sectional view taken in the direction of the arrows substantially along the line A—A in FIG. 1.

First, a positive electrode 1 as shown in FIGS. 1 and 2 was prepared. A positive electrode mixture, in which a positive electrode active material comprising $LiCoO_2$, a conductivity enhancer comprising carbon, and a binder comprising polyvinylidene fluoride (PVdF) were blended, was applied onto both sides of a sheet type positive electrode current collector 1a. The positive electrode current collector 1a had a thickness of 30 $\mu$m and comprised aluminum. A positive electrode 1 having a positive electrode active material layer 1b formed on both sides of the positive electrode current collector 1a was thus prepared. In this step, an area where the positive electrode mixture was not applied (Width: $L_1$: 10 mm), i.e. an area where the positive electrode active material layer 1b does not exist, was formed at a lengthwise end part of the positive electrode collector 1a. A positive electrode lead-attaching area 1c was thus formed.

Figure 3:
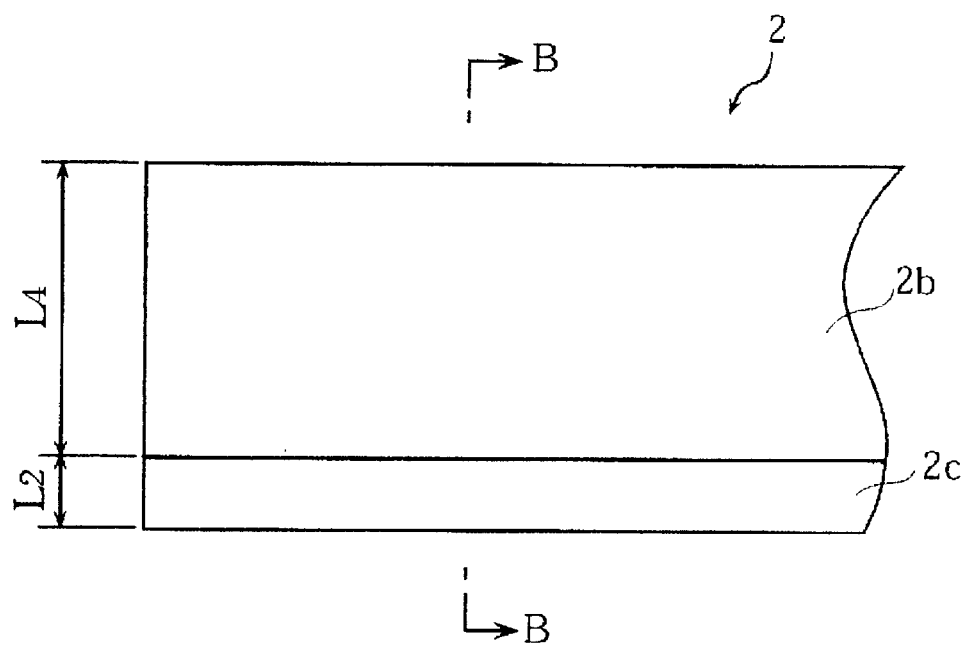
FIG. 3 is a front view of a negative electrode used for the present invention.
Figure 4:
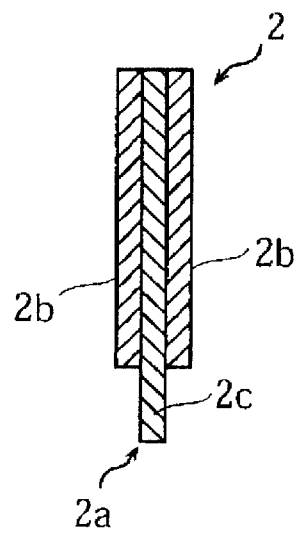
FIG. 4 is a cross-sectional view taken in the direction of the arrows substantially along the line B—B in FIG. 2.

At the same time, a negative electrode 2 as shown in FIGS. 3 and 4 was prepared. A negative electrode mixture, in which a negative electrode active material comprising natural graphite and a binder comprising PVdF were blended, was applied onto both sides of a sheet type negative electrode current collector 2a. The negative electrode current collector 1a had a thickness of 20 µm and comprised copper. A negative electrode 2 having a negative electrode active material layer 2b formed on both sides of the negative electrode current collector 2a was thus prepared. In this step, an area on which a negative electrode mixture was not applied (Width $L_2$: 10 mm), i.e., an area the negative electrode active material layer 1b does not exist, was formed at the other lengthwise end part (the opposite end part to the aforementioned lead-attaching area in the positive electrode 1) of the negative electrode current collector 2a. A negative electrode lead-attaching area 2c was thus formed.

Figure 5:
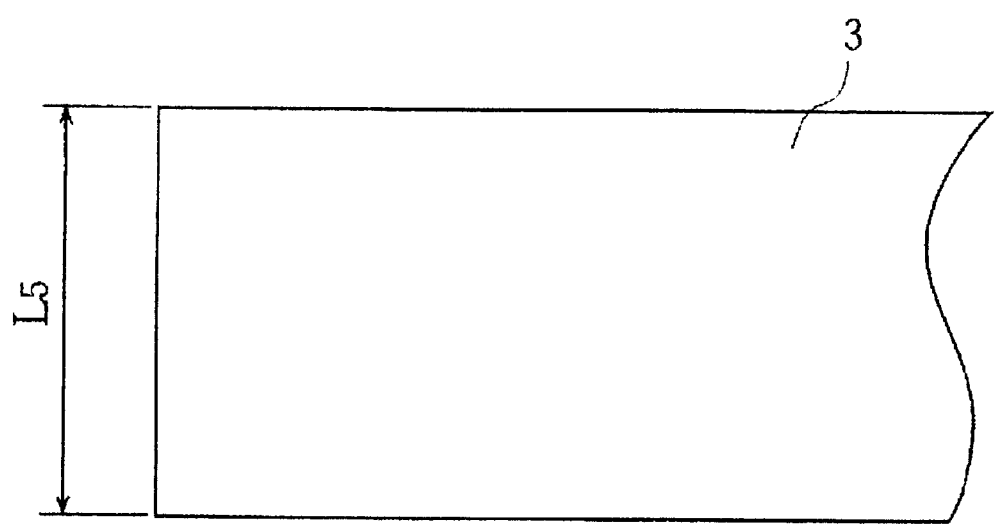
FIG. 5 is a front view of a separator used for the present invention.

Secondly, a separator 3 as shown in FIG. 5 was prepared. The separator 3 was prepared so that Width $L_5$ becomes a little larger than both Width $L_3$, which is a width of the aforementioned positive electrode active material layer 1b, and Width $L_4$, which is a width of the aforementioned negative electrode active material layer 2b. It is to be noted that the separator 3 may be composed of porous polyethylene or porous polypropylene.

Figure 6:
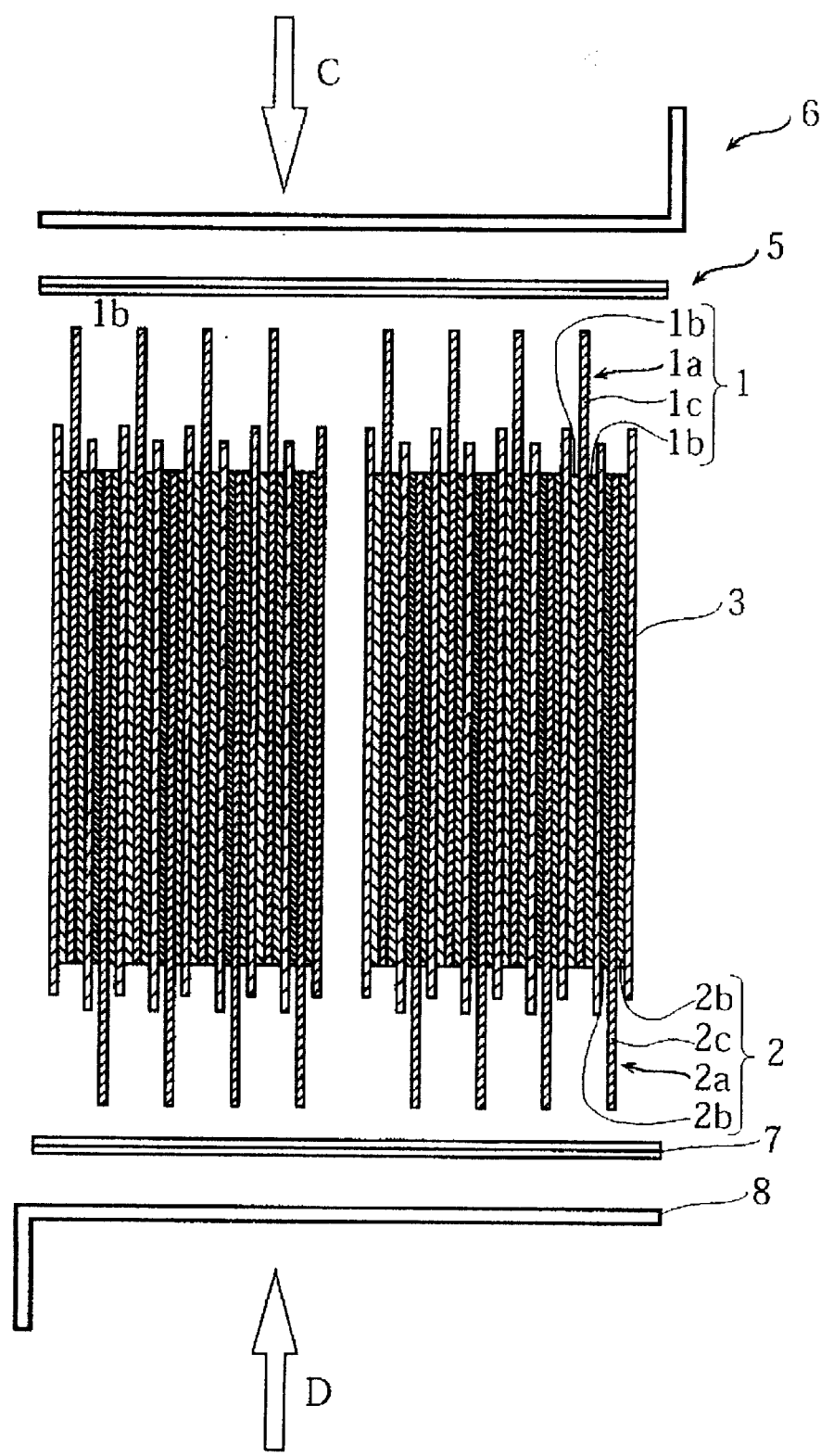
FIG. 6 is a cross-sectional view showing a spiral electrode assembly in which the positive electrode, the negative electrode, and the separator are laminated.

Subsequently, a spiral electrode assembly 4 as shown in FIG. 6 was prepared by spirally winding the positive electrode 1 and the negative electrode 2 with disposing the separation 3 therebetween. In this step, the spiral electrode assembly 4 was formed so that the positive electrode lead-attaching area 1c and the negative electrode lead-attaching area 2c were protruded from the edges of the separator 3 in the direction of the winding axis. Then, a positive electrode side punched metal 5 (thickness: 0.05 mm, hole diameter: 0.05 mm, rate of hole area: 50%), and a positive electrode lead 6, both composed of aluminum, were disposed respectively at the upper end of the spiral electrode assembly 4; thereafter, a laser beam was applied in the direction of the arrow C to laser-weld the positive electrode lead-attaching area 1c, the positive electrode side punched metal 5, and the positive electrode lead 6 together according to the laser welding conditions set forth below.

In a similar manner, a negative electrode side punched metal 7 (thickness: 0.05 mm, hole diameter: 0.05 mm, rate of hole area: 50%) and a negative electrode lead 8 (thickness: 0.15 mm), both composed of copper were disposed respectively at the other end of the spiral electrode assembly 4; thereafter, a laser beam was applied in the direction of the arrow D to laser-weld the negative electrode lead-attaching area 2c, the negative electrode side punched metal 7, and the negative electrode lead 8 according to the laser welding conditions set forth below.

The conditions of the above laser welding were as follows:
Laser beam spot diameter: about 1 mm
Laser output power for the positive electrode: 70 W
Laser output power for the negative electrode: 50 W The damage to the internal electrode assembly can be prevented by carrying out the laser welding according to the condition such that the laser beam spot diameter is larger than the hole diameter of the punched metal as described above, even if the laser beam penetrates the lead and hits the internal electrode assembly through the holes formed by the laser irradiation to the part where the lead-attaching area is not disposed.

Figure 7:
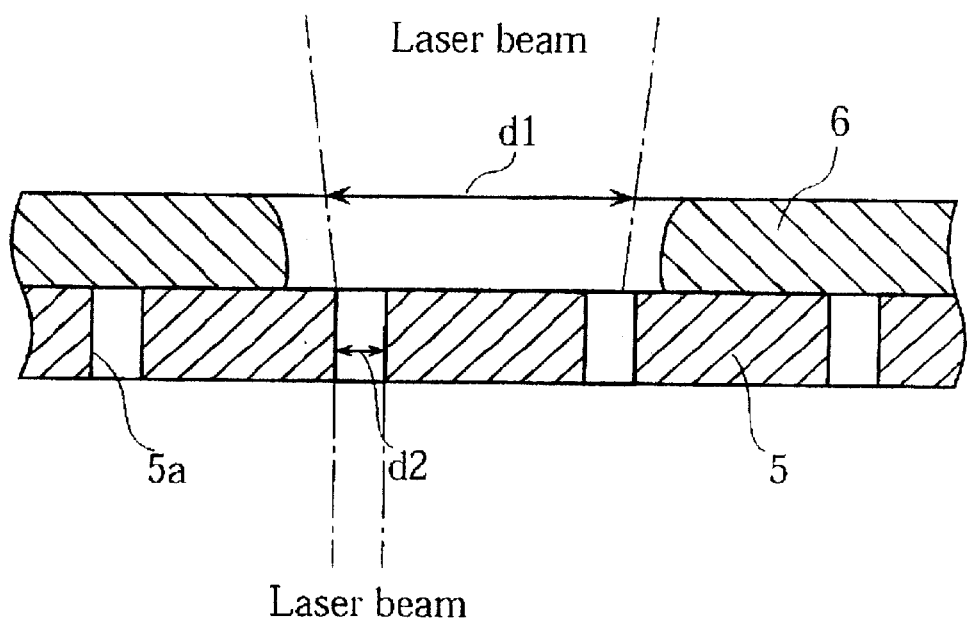
FIG. 7 is an explanatory diagram illustrating the effect of the punched metal in laser welding.

The reason for this will be given with reference to FIG. 7. In FIG. 7, 5a is a punched hole in the punched metal 5, d1 is a laser beam spot diameter, and d2 is a hole diameter of the punched metal 5. As seen in FIG. 7, when the spot diameter d1 is larger than the hole diameter d2 of the punched metal 5, only a small portion of the laser beam passing through the punched holes 5a reached the electrode assembly because most of the laser beam is shielded by the punched metal 5, even if the laser beam penetrates the lead 6. The strength of the laser beam is thus weakened to the degree that it does not affect the electrode assembly, and therefore the fusion in the electrode assembly and the resulting short circuits can be avoided.

After welding the leads and the lead-attaching areas and the punched metals, the aforementioned positive electrode lead 6 and a positive electrode current terminal (not shown in the figures) were laser-welded together. Likewise, the aforementioned negative electrode lead 8 and a negative electrode current terminal (not shown in the figure) were also laser-welded. Then, the prepared assembly was inserted into a cell can (not shown in the figures).

Lastly, a non-aqueous electrolyte in which $LiPF_6$ was dissolved with a concentration of 1M (mol/liter) in a solvent being a mixture of ethylene carbonate and diethyl carbonate (The mixed ratio was 1:1 in a voluminal ratio.) was prepared, and the electrolyte was poured into the cell can, following which the cell can was sealed.

The cell thus prepared according to the above-described manner is hereinafter referred to as a cell A of the present invention.

COMPARATIVE EXAMPLE

The cell of a comparative example was prepared according to the same manner as in the above-mentioned example except that positive electrode current collector tabs and negative electrode current collector tabs (both were 1 cm wide and 4 cm long) were welded with 30 cm intervals to the areas on which electrode mixtures containing active materials were not applied, and then the positive electrode current corrector tabs were laser-welded to a positive electrode current terminal and the negative electrode current corrector tabs were laser-welded to a negative electrode current terminal respectively.

The cell thus prepared according to the above-described manner is hereinafter referred to as a comparative cell X'.

EXPERIMENT

Table 1 shows the relationship between depths of discharge and power densities in the cell A of the present invention and a comparative cell X. The condition of the charging and discharging in this experiment was that the subjected cells were charged at a constant electric current of 0.14 C (9.8 A) until the cell voltage became 4.2 V, and discharged at a constant electric current of 0.125 C (8.8 A) until each depth of discharge was obtained. Power densities of the subjected cells were measured by discharging at a constant electric current of up to 5 C (350 A) for 10 seconds in each depth of discharge. It is to be noted that the power density values of the cell A of the present invention and the comparative cell X in Table 1 are shown in absolute values, not in relative values.

TABLE 1

| Depth of discharge (DOD) (%) | Power densities of the cell A (W/kg) | Power densities of the comparative cell X (W/kg) |
| --- | --- | --- |
| 0 | 1025 | 810 |
| 25 | 952 | 718 |
| 50 | 856 | 682 |
| 80 | 755 | 581 |

From the Table 1, it is noted that the cell A of the present invention has lager power densities than the comparative cell X at any depth of discharge. The reason for this is considered to be as follows. In the cell A of the present invention, the positive electrode current collector and the positive electrode lead-attaching area are integrally formed, and so are the negative electrode current corrector and the negative electrode lead-attaching area. In addition, the positive electrode current collector and the positive electrode lead-attaching area are laser-welded, and so are the negative electrode current corrector and the negative electrode lead-attaching area. Consequently, the resistance between the current collectors and the current terminals in both electrodes is substantially reduced, and thereby the internal resistance of the cell is remarkably reduced.

(OTHER NOTES)

(1) The aforementioned hole diameter of the punched metal is not limited to 0.05 mm. The preferred range of the hole diameter is determined corresponding to the conditions of laser welding and the rate of hole area of the punched metal. For example, when the conditions of laser-welding are the same as the ones described in the above example and the rate of hole area of the punched metal is 50% also as in the example, the punched metal with a hole diameter of from 0.05 to 0.3 mm should be employed. The reason why the hole diameter is thus restricted is that if a hole diameter of the punched metal is less than 0.05 mm, the cell characteristics are deteriorated because a laser beam penetrates the lead and the punched metal, and damages the electrode assembly. On the other hand, if a hole diameter of the punched metal is more than 0.3 mm, the electrical connection between the lead and the punched metal and the lead-attaching area becomes insufficient, which consequently causes an increase in internal resistance of the cell.

(2) The aforementioned thickness of the punched metal is not limited to 0.05 mm. The preferred range of the thickness is determined by the conditions of laser-welding and the rate of hole area of the punched metal. For example, when the conditions of laser-welding are the same as the ones described in the above example and the rate of hole area of the punched metal is 50% also as in the example, the punched metal with a thickness of from 0.01 to 0.1 mm should be employed. The reason why the hole diameter is thus restricted is that if a hole diameter of the punched metal is less than 0.01 mm, the cell characteristics are deteriorated because a laser beam penetrates the lead and punched metal, and damages the electrode assembly. On the other hand, if a hole diameter of the punched metal is more than 0.2 mm, the electrical connection between the lead and the punched metal and the lead-attaching area becomes insufficient, which consequently causes an increase in internal resistance of the cell.

(3) The positive electrode active materials for the present invention are not limited to $LiCoO_2$, which was used in the examples herein. Among the materials usable for the positive electrode active material are $LiNiO_2$, $LiMn_2O_4$, and the like. Likewise, the negative electrode active material for the present invention is not limited to natural graphite, used in the examples herein, but the other carbonaceous materials such as synthetic graphite, coke, and the like are also usable.

(4) The non-aqueous electrolytes usable for the present invention are not limited to the one with the composition as set forth in the example. An example of the non-aqueous electrolyte usable for the present invention is a solution in which a solute selected from the group consisting of $LiPF_6$, $LiClO_4$, $LiCF_3SO_3$, and combinations thereof is dissolved with a concentration of 0.7 to 1.5 M (mol/liter) in a solvent being a mixture of an organic solvent and a low boiling point solvent. In this case, the organic solvent may be selected from the group consisting of ethylene carbonate, vinylene carbonate, propylene carbonate, and combinations thereof, and the low boiling point solvent may be selected from the group consisting of diethyl carbonate, dimethyl carbonate, 1,2-dimethoxyethane, 1,2-diethoxyethane, ethoxymethoxyethan, and combinations thereof.

In light of the above, it is therefore understood that within the scope of the appended claims, the invention may be practiced otherwise than as specifically described.

What is claimed is:

1. A method of manufacturing a rechargeable cylindrical non-aqueous electrolyte secondary cell, comprising:

forming a positive electrode having a positive electrode active material layer formed on both sides of a sheet type positive electrode current collector, and a negative electrode having a negative electrode active material layer formed on both sides of a sheet type negative electrode current collector, at least one of said positive electrode and said negative electrode having a lead attaching area on which said active material is not formed on said current collector, winding both said electrodes into a spiral shape with a sheet type separator therebetween so that said lead-attaching area protrudes from an end part of said spiral shape, disposing a lead at an edge of said lead-attaching area with an interposed metal plate having a multiplicity of holes, and thereafter laser-welding said lead and said metal plate and said lead-attaching area together by applying a laser beam with a spot diameter larger than a diameter of a hole of said metal plate.

2. A method as in claim 1, wherein a total area of the holes in said metal plate is 45 to 70% of an area of the plate.

3. A method as in claim 1 or 2, wherein said metal plate is a punched metal.

4. A method as in claim 3, wherein a hole diameter of said punched metal is within the range of 0.05 to 0.3 mm, when the conditions of laser-welding are that a laser spot diameter is about 1 mm, a laser output power for the positive electrode is 70 W, and a laser output power for the negative electrode is 50 W, and the total area of the holes in said punched metal is 50% of the area of the punched metal.

5. A method as in claim 3, wherein a thickness of said punched metal is within the range of 0.01 to 0.2 mm, when the conditions of laser-welding are that a laser spot diameter is about 1 mm, a laser output power for the positive electrode is 70 W, and a laser output power for the negative electrode is 50 W, and the total area of the holes in said punched metal is 50% of the area of the punched metal.

6. A method as in claim 1, wherein said negative active material includes a lithium-containing complex oxide.

7. A method as in claim 6, wherein said lithium-containing complex oxide is selected from the group consisting of $LiCoO_2$, $LiNiO_2$, and $LiMn_2O_4$.

8. A method as in claim 1, wherein said negative electrode active material includes a carbonaceous material.

9. A method as in claim 8, wherein said carbonaceous material is selected from the group consisting of natural graphite, synthetic graphite, an coke.

10. A method as in claim 1, wherein said electrodes are in a non-aqueous electrolyte including a solution in which a solute is dissolved at a rate of 0.7 to 1.5 M in a solvent, the solvent being a mixture of an organic solvent and a low boiling point solvent.

11. A method as in claim 10, wherein said organic solvent is selected from the group consisting of ethylene carbonate, vinylene carbonate, propylene carbonate, and combinations thereof.

12. A method as in claim 10, wherein said low boiling point solvent is selected from the group consisting of diethyl carbonate, dimethyl carbonate, 1,2-dimethoxyethane, 1,2-diethoxyethane, ethoxymethoxyethane, and combinations thereof.

13. A method as in claim 10, wherein said solute is selected from the group consisting of $LiPF_6$, $LiClO_4$, $LiCF_3SO_3$, and combinations thereof.

* * * * *